United States Patent
Cai et al.

(10) Patent No.: US 11,328,212 B1
(45) Date of Patent: *May 10, 2022

(54) PREDICTING DEMOGRAPHIC INFORMATION USING AN UNRESOLVED GRAPH

(71) Applicant: Meta Platforms, Inc., Menlo Park, CA (US)

(72) Inventors: Chaochao Cai, Bellevue, WA (US); Goran Predovic, Redmond, WA (US); Logan Michael Gore, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 944 days.

This patent is subject to a terminal disclaimer.

(21) Appl. No.: 15/883,031

(22) Filed: Jan. 29, 2018

(51) Int. Cl.
*G06N 5/02* (2006.01)
*H04L 29/06* (2006.01)

(52) U.S. Cl.
CPC ............... *G06N 5/02* (2013.01); *H04L 63/10* (2013.01)

(58) Field of Classification Search
CPC .............. G06N 5/02; H04L 3/10; G06F 16/28
See application file for complete search history.

(56) References Cited

U.S. PATENT DOCUMENTS

| | | | |
|---|---|---|---|
| 7,162,522 B2 * | 1/2007 | Adar | G06Q 30/02 709/224 |
| 10,803,094 B1 | 10/2020 | Cai et al. | |
| 2003/0101024 A1 * | 5/2003 | Adar | G06Q 30/02 702/187 |
| 2006/0173556 A1 * | 8/2006 | Rosenberg | G06F 16/9535 700/3 |
| 2007/0208728 A1 * | 9/2007 | Zhang | G06F 16/951 |
| 2008/0215563 A1 * | 9/2008 | Shi | G06F 16/951 |
| 2010/0161385 A1 * | 6/2010 | Karypis | G06Q 30/0254 705/7.31 |
| 2010/0161642 A1 * | 6/2010 | Chen | G06F 16/951 707/759 |

(Continued)

*Primary Examiner* — Jennifer N Welch
*Assistant Examiner* — Qi Wan
(74) *Attorney, Agent, or Firm* — Fenwick & West LLP

(57) ABSTRACT

A method for predicting demographic information for a common user that is associated with a plurality of unresolved identifiers. An unresolved identifier defines a context in which a client device accesses one or more online systems, the context not determined to be associated with a specific user. The method comprises identifying a set of unresolved identifiers, and identifying information describing one or more access events associated with each unresolved identifier. For each pair of unresolved identifiers, a similarity score for the pair is determined based on the identified information. Responsive to the similarity score exceeding a threshold similarity score, the pair of unresolved identifiers is clustered, the clustering indicating a prediction that the pair of unresolved identifiers are associated with a common user. Predicted demographic information is determined for each unresolved identifier in the cluster. Based on predicted demographic information determined for each unresolved identifier in the cluster, aggregate demographic information is determined for the common user.

20 Claims, 8 Drawing Sheets

(56) References Cited

U.S. PATENT DOCUMENTS

| | | | |
|---|---|---|---|
| 2014/0143012 A1* | 5/2014 | Alon | G06N 7/005 |
| | | | 705/7.29 |
| 2016/0110730 A1* | 4/2016 | Provost | G06Q 30/0254 |
| | | | 705/7.29 |
| 2017/0091270 A1* | 3/2017 | Guo | G06F 16/24544 |
| 2017/0235846 A1* | 8/2017 | Atlas | G06F 16/285 |
| | | | 707/737 |
| 2020/0125037 A1 | 4/2020 | Jo et al. | |

* cited by examiner

User 308

| Browsing History 501 | Gender Vote 502 | Gender Confidence 503 | Age Vote 504 | Age Confidence 505 | Aggregate Gender 506 | Aggregate Age 507 |
|---|---|---|---|---|---|---|
| Unresolved Identifier 304 | Visited 3 baby names websites in the last week | Female | 0.50 | Over 25 years old | 0.84 | Female | Over 25 years old |
| Unresolved Identifier 305 | Follows Taylor Swift on Instagram | Female | 0.90 | Under 25 years old | 0.21 | | |
| Unresolved Identifier 306 | Watches Spongebob Squarepants videos | Male | 0.43 | Under 25 years old | 0.53 | | |

FIG. 5

PREDICTING DEMOGRAPHIC INFORMATION USING AN UNRESOLVED GRAPH

BACKGROUND

This disclosure relates in general to predicting demographic information for a user associated with an unresolved identifier. More specifically, this disclosure relates to predicting demographic information for a common user that is determined to be associated with a plurality of unresolved identifiers.

An identifier defines a context in which a client device accesses one or more online systems via a network. An identifier that has not been determined to be associated with a particular user is referred to as an unresolved identifier.

It is difficult to determine demographic information for a user associated with an unresolved identifier. This is because unresolved identifiers are not known to be associated with a particular user, and therefore are not associated with known demographic information. Additionally, limited information may be available for a single unresolved identifier, making it difficult to accurately infer demographic information about a user associated with a single unresolved identifier.

SUMMARY

To more effectively determine reach for these unresolved identifiers, unresolved identifiers are clustered together when they likely represent the same user, and reach of a content item may then be evaluated with respect to these clusters to more accurately reflect actual users that viewed the item.

An identifier defines a context in which a client device accesses one or more online systems via a network. Specifically, an identifier is described by a unique combination of one or more data item values that define a context for a client device accessing one or more online systems via a network. Data items that can describe an identifier include but are not limited to a cookie, a browser ID, a device ID, an HTML request, and an IP address. An identifier may be described by any combination of these data items. For example, in some embodiments, an identifier is a set of data items that identify a client device.

Information describing characteristics of one or more access events associated with an identifier is reported to an online system. This information can be information that was explicitly shared during an access event associated with the identifier and may also include information inferred and/or derived by the online system. For instance, actions performed by an identifier during one or more access events can be reported to the online system.

Based on the information reported to the online system, the online system determines whether an identifier is known to be associated with a specific user. For example, in some embodiments, if an identifier is not used to log into an account on the online system, the online system may be unable to associate the identifier with a particular user. An identifier that has not been determined to be associated with a particular user is referred to as an unresolved identifier. Unresolved identifiers are stored as nodes in an unresolved identifier graph by the online system.

For each pair of unresolved identifier nodes in the unresolved identifier graph, the online system determines a similarity score for the pair of unresolved identifiers. A similarity score for a pair of unresolved identifiers represents a correlation between the information describing access events for each unresolved identifier of the pair.

In certain embodiments, if a similarity score determined for a pair of unresolved identifiers exceeds a threshold similarity score, the pair of unresolved identifier nodes are clustered together in the unresolved identifier graph. This clustering indicates a prediction that the pair of unresolved identifiers are associated with a common user.

In some embodiments, more than two unresolved identifier nodes may be included in a cluster. Specifically, any number of unresolved identifier nodes may be included in a cluster as long as each unresolved identifier in the cluster has a similarity score with at least one other unresolved identifier in the cluster that exceeds the threshold similarity score.

The online system predicts demographic information for a common user associated with a cluster of unresolved identifier nodes in an unresolved identifier graph. Specifically, each unresolved identifier within the cluster of unresolved identifier nodes determines predicted demographic information for the common user. The predicted demographic information determined by each unresolved identifier is based on the information describing characteristics of one or more access events associated with the identifier. In some embodiments, predicted demographic information for an unresolved identifier is determined by inputting the information associated with the unresolved identifier into a demographic prediction model.

Based on the predicted demographic information determined for each unresolved identifier in the cluster of unresolved identifiers, aggregate demographic information is determined for the common user. In some embodiments, a poll is conducted to determine the aggregate demographic information for the common user. A poll is a method to estimate demographic information about the common user based on the respective information about the individual unresolved identifier nodes included in a cluster of unresolved identifier nodes associated with the user. In such embodiments, each unresolved identifier casts a single vote in the poll, the vote reflecting the predicted demographic information determined by the unresolved identifier. Based on the results of the poll, the aggregate demographic information for the common user is determined. For example, the aggregate demographic information may be determined to be the predicted demographic information that received a majority of the votes in the poll.

In further embodiments, a confidence score is determined for the predicted demographic information for each unresolved identifier. A confidence score is a numerical value that represents a likelihood that demographic information predicted by an unresolved identifier is accurate. A vote cast by an unresolved identifier in a poll for determining aggregate demographic information can be weighted based on a confidence score for the demographic information predicted by the unresolved identifier. In this way, unresolved identifiers that predict demographic information with greater confidence have more influence over the aggregate demographic information than unresolved identifiers that predict demographic information with lesser confidence.

In some embodiments, aggregate demographic information determined for a common user can be associated with each unresolved identifier in a cluster of unresolved identifiers that is associated with the common user.

BRIEF DESCRIPTION OF THE DRAWINGS

FIG. 5 is an example illustrating determination of demographic information for a user associated with a plurality of clustered unresolved identifier nodes shown in FIG. 3C, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
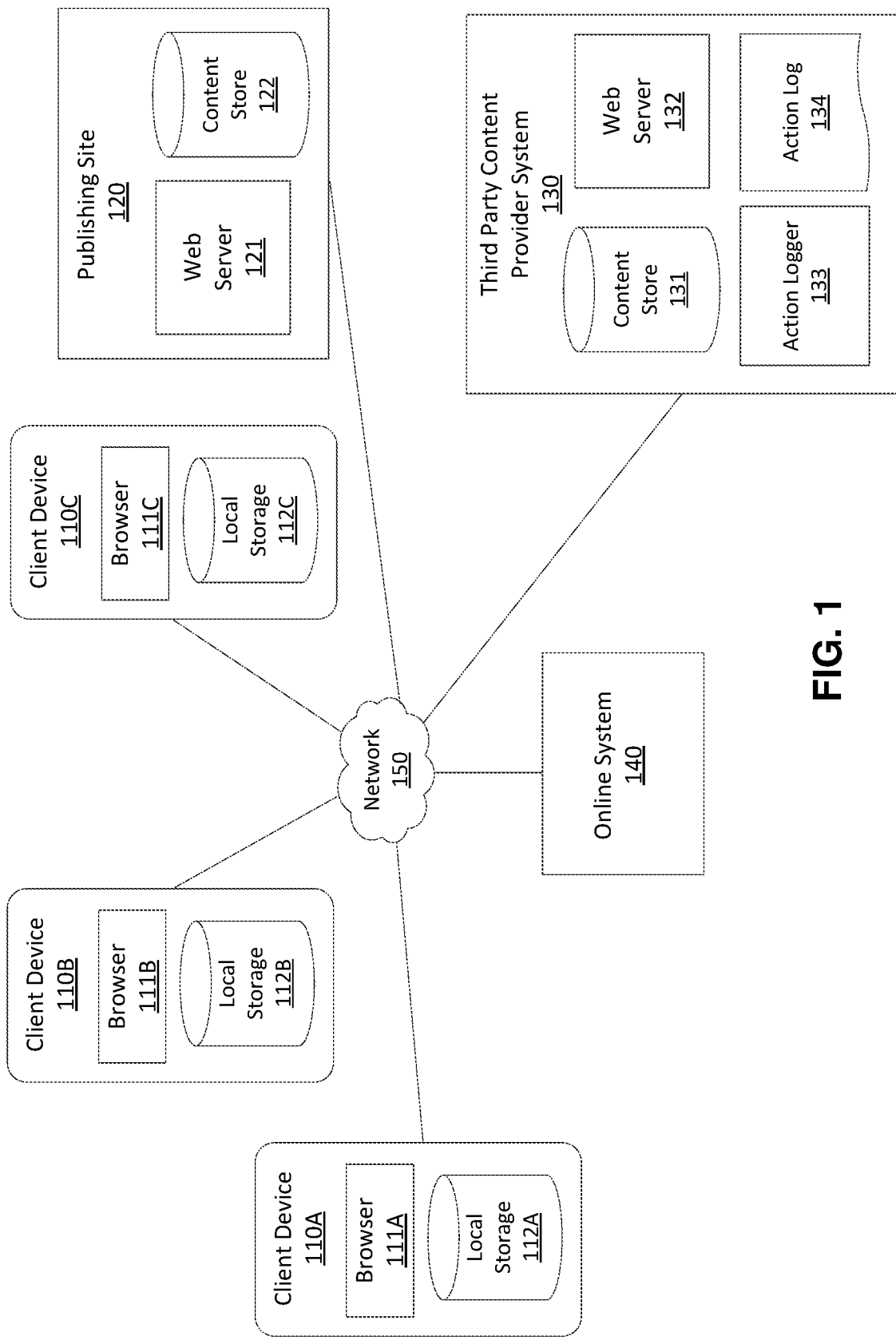
FIG. 1 shows a system environment illustrating the interactions in which an online system may predict demographic information for a common user that is determined to be associated with a plurality of unresolved identifiers based on an unresolved identifier graph, according to an embodiment.

FIG. 1 shows a system environment illustrating the connections between one or more client devices 110 (e.g., client devices 110A, 110B, and 110C), a publishing site 120, a third party content provider system 130, and an online system 140, interacting with each other via a network 150, according to an embodiment. In various embodiments, each of the client devices 110, the publishing site 120, the third party content provider system 130, the online system 140, and the network 150 may include additional, fewer, or different components for various applications. Conventional components such as network interfaces, security functions, load balancers, failover servers, management and network operations consoles, and the like are not shown so as to not obscure the details of the system architecture.

In the system environment shown in FIG. 1, client devices 110 access content across various online systems via the network 150. For example, a client devices 110 may access content on the publishing site 120, the third party content provider system 130, and/or the online system 140. When a client device 110 accesses an online system via the network 150, information regarding the access event is reported to the online system 140. Based on the information provided to the online system 140, the online system 140 can determine an identifier to associate with the access event. As used herein, an identifier defines a context in which the access event occurred. Specifically, an identifier is described by a unique combination of one or more data item values that define a context for a client device 110 accessing systems via the network 150.

The online system 140 also determines whether an identifier is known to be associated with a specific user. An identifier that has been determined to be associated with a particular user is referred to as a "resolved identifier." Conversely, an identifier that has not been determined to be associated with a particular user is referred to as an "unresolved identifier." Based on a similarity between one or more unresolved identifiers, the one or more unresolved identifiers can be clustered together by the online system 140, the clustering indicating a prediction that the one or more unresolved identifiers are associated with a common user. Based on this clustering of unresolved identifiers, demographic information for the unresolved identifiers can be determined, content can be served to client devices 110 associated with the unresolved identifiers, and reach can be determined for served content.

A client device 110 is a computing device configured to receive user input as well as transmit and/or receive data via the network 150. In one embodiment, the client device 110 is a conventional computer system, such as a desktop or laptop computer. Alternatively, a client device 110 may be a device having computer functionality, such as a personal digital assistant (PDA), a mobile telephone, a smartphone or another suitable device. In some embodiments, a device ID of a client device 110 may be used in part to define or describe an identifier identified by the online system 140 when the client device 110 accesses an online system via the network 150. In one embodiment, a client device 110 executes an application allowing a user of the client device 110 to interact with an online system. For example, a client device 110 executes a browser application (also referred to as a browser 111) to enable interaction between the client device 110 and online systems via the network 150. In another embodiment, a client device 110 interacts with an online system through an application programming interface (API) running on a native operating system of the client device 110, such as IOS® or ANDROID™. In certain embodiments, a browser ID and/or and API can also be used in part to define or describe an identifier associated with an access event initiated by a client device 110.

A client device 110 is configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Each client device 110 includes a local storage 112 for storing data. The local storage may store data associated with the browser 111. The browser 111 receives web pages from various systems and executes instructions based on the web pages. In an embodiment, the browser 111 stores data received from various online systems in the local storage 112, for example, for caching data for fast access, or for storing cookies of various websites or online systems. The local storage 112 stores cookies representing data received from an online system that is stored on the client device 110 that may be provided to the online system when the client device 110 sends requests to the online system. For example, an online system may store user preferences as cookies. As described in further detail below with regard to the online system 140, data stored by a client device 110 in the local storage 112 may be used to define an identifier associated with an access event initiated by the client devices 110. For example, a browser ID stored in the local storage 112 may be used to describe an identifier. In another embodiment, data from various online systems that is stored in the local storage 112 by the browser 111 can be used to describe an identifier associated with an access event. In certain embodiments, the identifier data stored in the local storage 112 is stored in (or in the form of) one or more cookies.

The publishing site 120 provides content to the client devices 110. The content provided by the publishing site 120 may include text, images, videos, audio, or combination of various media types. In an embodiment, the publishing site 120 includes a web server 121 and a content store 122. The publishing site 120 receives requests for content or request for web pages from client devices 110. The web server 121 processes the received requests by configuring a web page for sending to the client devices 110 that requested the webpage. The web server 121 includes content from content store 122 in the web page. The web server 121 sends the configured web page for presentation via the browser 111 of the client device 110. The browser 111 of the client device 110 receives the web page and renders the web page for presentation via a display screen of the client device 110.

In an embodiment, the publishing site 120 receives content from the third party content provider system 130 and includes the content in the web page sent to the client device 110. In an embodiment the publishing site 120 sends a request to the third party content provider system 130 identifying the content to be included in the web page being configured for presentation via the browser 111. In other embodiments, the publishing site 120 sends one or parameters associated with various content items and the third party content provider system 130 selects content for including in the web page based on a matching of the one or more parameters with information describing the content. The parameters may describe the content of the web page requested by the user or information received from the user, for example, one or more keywords or terms occurring in the web page. In some embodiments, the third party content provider system 130 determines the content to be included in the webpage based on information associated with the various content items, for example, a number of times that a content item was previously included in webpages, or a time (or time range) associated with the content item during which the content is suggested to be included in web pages. For example, the third party content provider system 130 may store a rate of distribution of the content in web pages of publishing sites 120. The third party content provider system 130 determines whether to include the content item in a web page of a publishing site 120 based on the rate.

The third party content provider system 130 includes a content store 131, a web server 132, an action logger 133, and an action log 134. The content store 131 stores content that is provided to publishing sites 120 for including in the web pages provided by the publishing site 120 to client devices 110.

The web server 132 receives requests for content from the publishing site 120 and sends content for including in the web pages provided by the publishing site 120. The third party content provider system 130 may directly send content to a client device 110 for presentation via the browser 111. In an embodiment, the web server 132 includes tracking pixels in the content provided to the publishing sites 120 such that when the content is presented via the browser 111 of the client device 110, a particular program or code (or set of instructions) is executed by the browser 111. In an embodiment, this code associated with the pixel causes a record of the presentation of content to the client device 110 to be sent to the online system 140. A tracking pixel may be a transparent 1×1 image, an iframe, or other suitable user interface object. In some embodiments, access of a client device 110 to content from a third party content provider system 130 may be associated with an identifier that is linked to the access event. Such embodiments are discussed in greater detail below with regard to the online system 140.

The web server 132 further receives information describing user actions performed on online systems by users via client applications on a client device 110. The action logger 133 stores this information describing user actions in the action log 134. The action log 134 stores a browser identifier associated with the device obtained from the client application and information describing the user action performed. In some embodiments, actions performed on online systems via a client device 110 may be associated with an identifier that is linked to the actions. Such embodiments are discussed in greater detail below with regard to the online system 140.

As described above, the online system 140 is configured to receive information from client devices 110 when the client devices 110 access an online system via the network 150. Specifically, the online system 140 receives information from the client devices 110 that describes access events. Based on the information provided to the online system 140, the online system 140 can determine identifiers to associate with the access events. The online system 140 also determines whether the identifiers are resolved or unresolved identifiers. Furthermore, the online system 140 can cluster one or more of the unresolved identifiers based on a similarity between the unresolved identifiers. A user in common across unresolved identifiers can be predicted with the clustering of unresolved identifiers by the online system 140. Based on clustering of unresolved identifiers, demographic information for the unresolved identifiers can be determined, content can be served to client devices 110 associated with the unresolved identifiers, and reach can be determined for served content. The online system 140 is discussed in greater detail below with regard to FIG. 2.

System Architecture

Figure 2:
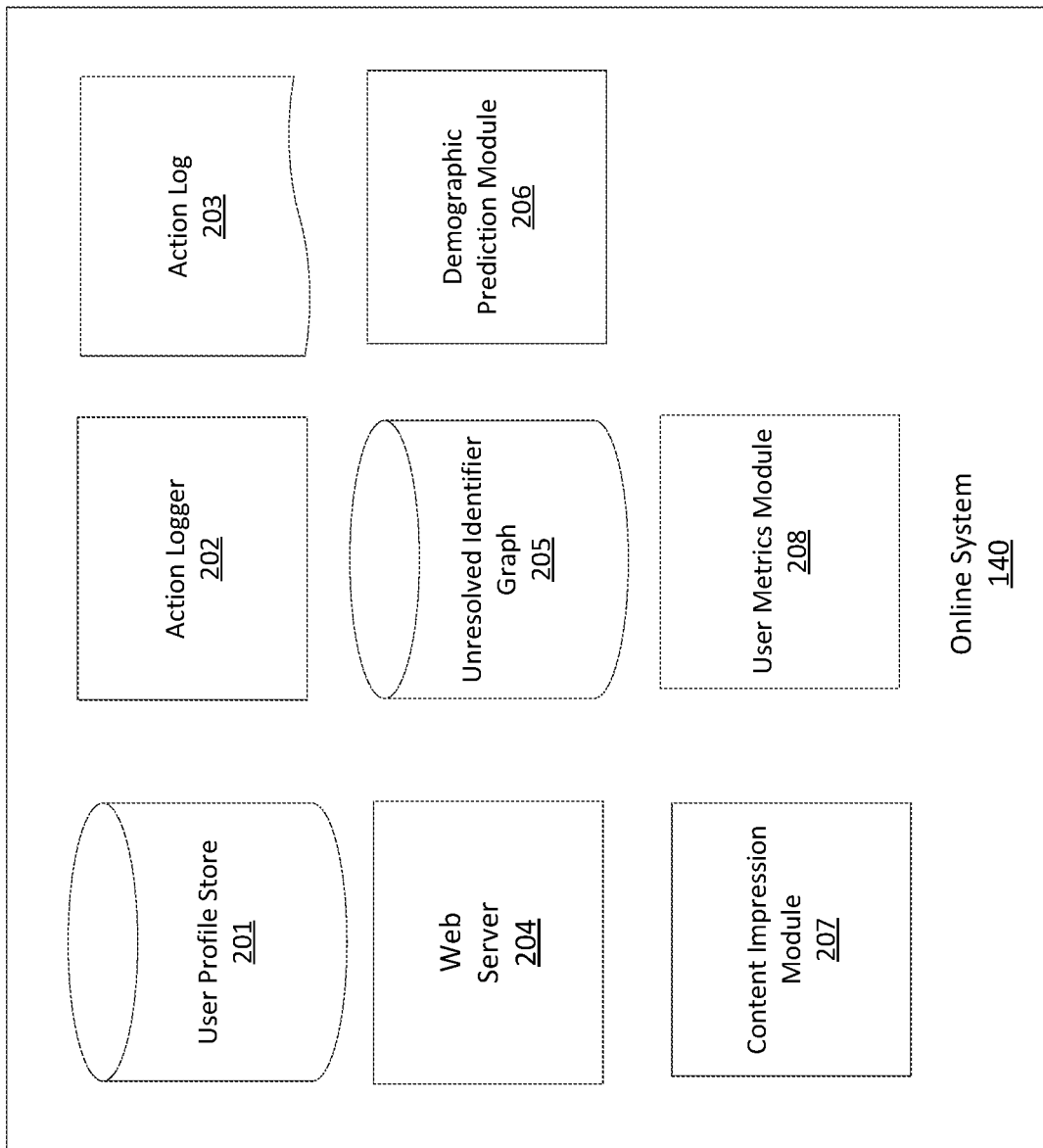
FIG. 2 is a block diagram illustrating the system architecture of an online system, according to an embodiment.

The online system 140 shown in FIG. 2 includes a user profile store 201, an action logger 202, an action log 203, a web server 204, an unresolved identifier graph 205, a demographic prediction module 206, a content impression module 207, and a user metrics module 208.

The user profile store 201 stores user profiles describing users of the online system 140. A user profile includes information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. A user profile in the user profile store 201 may also maintain references to actions by the corresponding user that are stored in the action log 203.

In certain embodiments, a user profile stored in the user profile store 201 also includes reference to one or more identifiers that have been determined to be associated with the user profile. As noted above, an identifier is described by a unique combination of one or more data item values that define a context for a client device 110 interacting with systems (e.g., the online system 140) via the network 150. Data items that can describe an identifier include but are not limited to a cookie, a browser ID, a device ID, an HTML request, and an IP address. An identifier may be described by any combination of these data items. For example, in some embodiments, an identifier is a set of data items that identify a client device 110. In such embodiments, an identifier may comprise a device ID. In alternative embodiments, an identifier may comprise both a device ID and a browser ID cookie. In alternative embodiments, an identifier may comprise an alternative combination of data items.

As described above, data item values that describe an identifier may be sourced from the local storage 112 of a client device 110. For example, cookies of various websites or online systems accessed by the client device 110 may be stored in the local storage 112 and used to describe an identifier associated with the access events. Furthermore, cookies representing data received from an online system may be stored in the local storage 112 of a client device 110 and used to describe an identifier. For example, user preferences stored as cookies in the local storage 112 of the client device 110 by an online system may be used to describe an identifier. In further embodiments, when a user logs in to an account on an online system via the network 150, the online system can write one or more cookies to the client device 110 for storing on the client device 110, for example, in the local storage 112. These cookies can also be used to describe an identifier associated with the log in event. A browser ID may also be stored in the local storage 112 of a client device 110 and used to describe an identifier.

An identifier may also be associated with information describing characteristics of one or more access events for the identifier. Association of an identifier with information describing the identifier's access events is described in greater detail below with regard to the action logger 202 and the action log 203.

Returning to the user profile store 201, one or more identifiers can be associated with a user profile. For example, an identifier that is used to access a user profile of the online system 140 via the network 150 may be associated with the user profile that was accessed. Thus the identifier is associated with the user profile, and the identifier is associated with the user of the user profile. As noted above with regard to FIG. 1, an identifier that has been determined to be associated with a particular user is referred to as a resolved identifier.

In certain cases, an identifier that is detected on the network 150 by the online system 140 is not associated with a user profile stored in the user profile store 201. For example, the identifier might never access or be associated with a user profile stored on the online system 140. In such cases, the online system 140 does not associate the identifier with a particular user of the online system 140. As noted above with regard to FIG. 1, an identifier that has not been determined to be associated with a particular user is referred to as an unresolved identifier. When an unresolved identifier is detected by the online system 140, the unresolved identifier is stored as a node in the unresolved identifier graph 205. The unresolved identifier graph 205 is discussed in greater detail below.

The action logger 202 receives communications about information describing access events associated with identifiers, populating the action log 203 with this information. In other words, the action log 203 contains information describing characteristics of one or more access events for identifiers detected by the online system 140. For instance, the action log 203 may maintain references to actions performed by an identifier via the network 150. For example, an identifier may be associated with a frequency at which a client device 110 associated with the identifier requests content or web pages. For instance, if a client device 110 associated with a given identifier requests access to the third party content provider system 130, the request may be associated with the identifier. A number of actions may involve an object and one or more particular users identifiers, so these actions are associated with those identifiers as well and stored in the action log 203.

The information describing characteristics of one or more access events associated with an identifier can be information that was explicitly shared during an access event associated with the identifier and may also include information inferred or derived by the online system 140. Examples of information associated with an identifier include biographic, demographic, and other types of descriptive information, such as work experience, educational history, gender, hobbies or preferences, location and the like. For example, when demographic information is input into an online system during an access event that is associated with the identifier, the demographic information may be associated with the identifier. An identifier may also be associated with other information provided, for example, images or videos. The data items and actions that describe an identifier may increase in quantity and complexity as the quantity and complexity of interactions between the identifier and the network 150 and/or online systems connected to the network 150 increase over time.

Information to associate with an identifier can be determined in a variety of ways. For example, as discussed above with regard to the third party content provider system 130, tracking pixels included in the content provided to the publishing site 120 by a third party content provider system 130 may be used to track an identifier's interactions with the content provided by the third party content provider system 130. As another example, information describing interactions between an identifier a third party content provider system 130 that is stored by the action logger 133 in the action log 134 can be associated with the identifier. As yet another example, data stored by a client device 110 in the local storage 112 may be associated with an identifier that is associated with an access event initiated by the client device 110.

In embodiments in which an identifier is associated with a user profile, the information stored in the action log 203 for the identifier is also associated with the user profile, and information associated with the user profile is also associated with the identifier and stored in the action log 203.

As noted above, the unresolved identifier graph 205 stores unresolved identifiers detected by the online system 140 as nodes. Furthermore, the unresolved identifier graph 205 clusters the unresolved identifier nodes based on the information associated with the unresolved identifiers that is stored in the action log 203. Specifically, for each pair of unresolved identifiers in the unresolved identifier graph 205, the online system 140 determines a similarity score for the pair of unresolved identifiers. A similarity score for a pair of unresolved identifiers represents a correlation between the information describing access events for each unresolved identifier of the pair. This information describing access events for each unresolved identifier of the pair is sourced from the action log 203.

In certain embodiments, if a similarity score determined for a pair of unresolved identifiers exceeds a threshold similarity score, the pair of unresolved identifier nodes are clustered together in the unresolved identifier graph 205. This clustering indicates a prediction that the pair of unresolved identifiers are associated with a common user.

In some embodiments, more than two unresolved identifier nodes may be included in a cluster. Specifically, any number of unresolved identifier nodes may be included in a cluster as long as each unresolved identifier in the cluster has a similarity score with at least one other unresolved identifier in the cluster that exceeds the threshold similarity score.

In further embodiments, if a similarity score determined for a pair of unresolved identifiers exceeds an additional threshold similarity score, an edge is created that links the pair of unresolved identifier nodes in the unresolved identifier graph 205. In other words, unlike a cluster of unresolved identifier nodes which can include any number of unresolved identifier nodes, an edge creates a one-to-one link between a total of two unresolved identifier nodes. The additional threshold similarity score can equal the threshold similarity score, can be greater than the threshold similarity score, or can be less than the threshold similarity score. In further embodiments, a pair of unresolved identifiers nodes can be clustered if an edge exists between the pair of the unresolved identifier nodes. In embodiments in which the additional threshold similarity score is greater than the threshold similarity score and in which nodes are clustered if an edge exists between the nodes, a relatively sparser and more selective unresolved identifier graph 205 is formed.

Formation of an unresolved identifier graph 205 is discussed in greater detail below with regard to FIGS. 3A-C and 4. Additionally, formation of an unresolved identifier graph 205 is further described in U.S. patent application Ser. No. 15/685,121, filed on Aug. 24, 2017, and U.S. patent application Ser. No. 15/179,935, filed on Jun. 10, 2016, which are hereby incorporated by reference in their entireties.

The demographic prediction module 206 predicts demographic information for a common user associated with a cluster of unresolved identifier nodes in the unresolved identifier graph 205. Specifically, each unresolved identifier within the cluster of unresolved identifier nodes determines predicted demographic information for the common user. The predicted demographic information determined by each unresolved identifier is based on the information associated with the unresolved identifier and stored in the action log 203. In some embodiments, predicted demographic information for an unresolved identifier is determined by inputting the information associated with the unresolved identifier and stored in the action log 203 into a demographic prediction model.

Prediction of demographic information for a user based on information about access events associated with an unresolved identifier is further described in U.S. patent application Ser. No. 14/808,298, filed on Jul. 24, 2015, U.S. patent application Ser. No. 13/338,172, filed on Dec. 27, 2011, U.S. patent application Ser. No. 15/236,228, filed on Aug. 12, 2016, and U.S. patent application Ser. No. 13/338, 174, filed on Dec. 27, 2011, which are hereby incorporated by reference in their entireties.

Based on the predicted demographic information determined for each unresolved identifier in the cluster of unresolved identifiers, aggregate demographic information is determined for the common user. In some embodiments, a poll is conducted to determine the aggregate demographic information for the common user. A poll is a method to estimate demographic information about the common user based on the respective information about the individual unresolved identifier nodes included in a cluster of unresolved identifier nodes associated with the user. In such embodiments, each unresolved identifier casts a single vote in the poll, the vote reflecting the predicted demographic information determined by the unresolved identifier. Based on the results of the poll, the aggregate demographic information for the common user is determined. For example, the aggregate demographic information may be determined to be the predicted demographic information that received a majority of the votes in the poll.

In further embodiments, a confidence score is determined for the predicted demographic information for each unresolved identifier. A confidence score is a numerical value that represents a likelihood that demographic information predicted by an unresolved identifier is accurate. A vote cast by an unresolved identifier in a poll for determining aggregate demographic information can be weighted based on a confidence score for the demographic information predicted by the unresolved identifier. In this way, unresolved identifiers that predict demographic information with greater confidence have more influence over the aggregate demographic information than unresolved identifiers that predict demographic information with lesser confidence.

Finally, in some embodiments, aggregate demographic information determined for a common user can be associated with each unresolved identifier in a cluster of unresolved identifiers that is associated with the common user. The prediction of demographic information for a user is described in greater detail below with regard to FIGS. 5 and 6.

The content impression module 207 provides content items to client devices associated with one or more unresolved identifiers. This provision of content items is based on clustering of the unresolved identifiers. Specifically, in some embodiments, for a cluster of unresolved identifiers, the content impression module 207 displays a content item on a single client device 110 associated with at least one unresolved identifier of the cluster of unresolved identifiers. This ensures that the common user associated with the cluster of unresolved identifiers views the content item one time on one device.

In alternative embodiments, for a cluster of unresolved identifiers, the content impression module 207 sequentially displays a content item on one or more client devices 110 associated with one or more unresolved identifiers in the cluster of unresolved identifiers. For example, in such embodiments, the content impression module 207 can display the content item on a first client device 110 associated with a first unresolved identifier in the cluster of unresolved identifiers, and subsequently display the content item on a second, alternative client device 110 associated with a second, alternative unresolved identifier in the cluster of unresolved identifiers. In certain embodiments, the content impression module 207 waits a period of time between displaying the content item on the two client devices 110. For instance, the content impression module 207 can wait a period of time between displaying the content item on the first client device 110 and on the second, alternative client device 110. This sequential and repeated display of the content item can increase the likelihood that the user will interact with the content item.

Finally, in some embodiments, the content impression module 207 refrains from presenting content items on client devices 110 that are associated with un-clustered unresolved identifiers. This enables the content impression module 207 to avoid presenting content to transient or ephemeral identifiers that cannot be resolved to a particular user. For example, un-clustered unresolved identifiers may signify shared and/or public computers where different interactions don't signify the same user. The presentation of content on client devices 110 associated with one or more unresolved identifiers is discussed in greater detail below with regard to FIG. 7.

The user metrics module 208 determines reach of a content item that is displayed on one or more client devices 110 associated with unresolved identifiers. Reach of a content item represents a quantity of users presented with the content item. Reach determination is based on clustering of the unresolved identifiers. For example, if a content item is displayed on two client devices 110, and each client device 110 of the two client devices 110 is associated with an unresolved identifier that belongs to the same cluster of unresolved identifiers associated with a common user, the reach of the content item is 1 user because the content item is presented twice, but to the same common user. In certain embodiments, the user metrics module 208 excludes un-clustered unresolved identifiers from calculation of reach because un-clustered unresolved identifiers cannot be resolved to a particular user as described above. This exclusion of un-clustered unresolved identifiers from reach calculation enables a more accurate reach calculation because an un-clustered unresolved identifier may not represent a single user. The determination of reach of a content item presented on client devices 110 associated with one or more unresolved identifiers is discussed in greater detail below with regard to FIG. 8.

Unresolved Identifier Graph

Figure 3A:
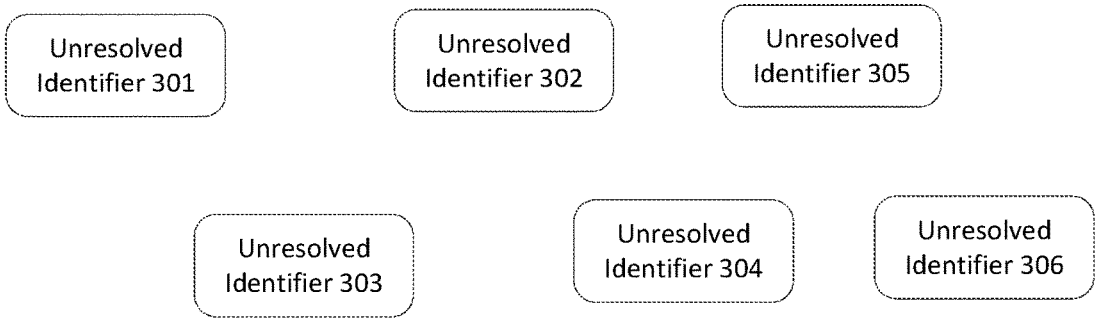
FIG. 3A is an example illustrating a plurality of unresolved identifier nodes, according to an embodiment.

FIG. 3A is an example illustrating a plurality of unresolved identifier nodes, according to an embodiment. Specifically, FIG. 3A depicts unresolved identifier nodes in an unresolved identifier graph. The unresolved identifier nodes include unresolved identifier nodes 301, 302, 303, 304, 305, and 306.

Figure 3B:
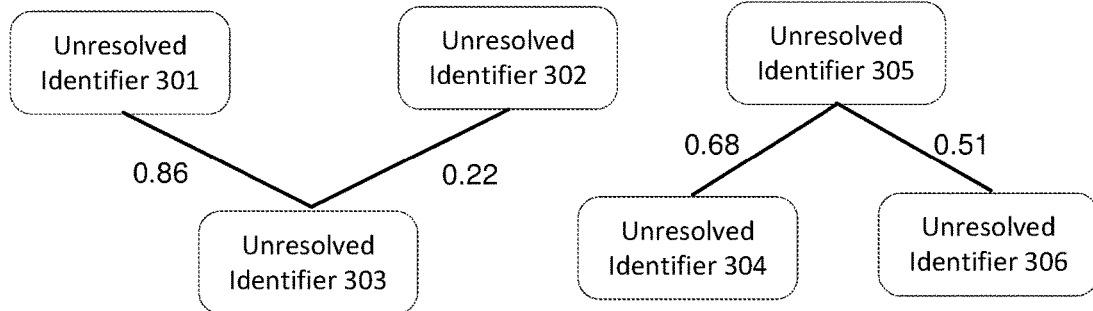
FIG. 3B is an example illustrating edges connecting the plurality of unresolved identifier nodes of FIG. 3A, according to an embodiment.

FIG. 3B is an example illustrating edges connecting the plurality of unresolved identifiers nodes of FIG. 3A, according to an embodiment. As discussed above with regard to FIG. 2, in certain embodiments, an edge can be generated between a pair of unresolved identifier nodes in an unresolved identifier graph if a similarity score determined for the pair of unresolved identifiers exceeds an additional threshold similarity score. In the embodiment shown in FIG. 3B, the additional threshold similarity score is 0.2. Therefore, pairs of unresolved identifiers with a similarity score that exceeds 0.2 are linked by an edge. As shown in FIG. 3B, the unresolved identifier node 301 and the unresolved identifier node 302 have a similarity score of 0.86 and thus are linked by an edge, the unresolved identifier node 302 and the unresolved identifier node 303 have a similarity score of 0.22 and thus are linked by an edge, the unresolved identifier node 304 and the unresolved identifier node 305 have a similarity score of 0.68 and thus are linked by an edge, and the unresolved identifier node 305 and the unresolved identifier node 306 have a similarity score of 0.51 and thus are linked by an edge. In alternative embodiments, the additional threshold similarity score differs. In alternative embodiments not shown here, edges are not formed between pairs of unresolved identifiers.

Figure 3C:
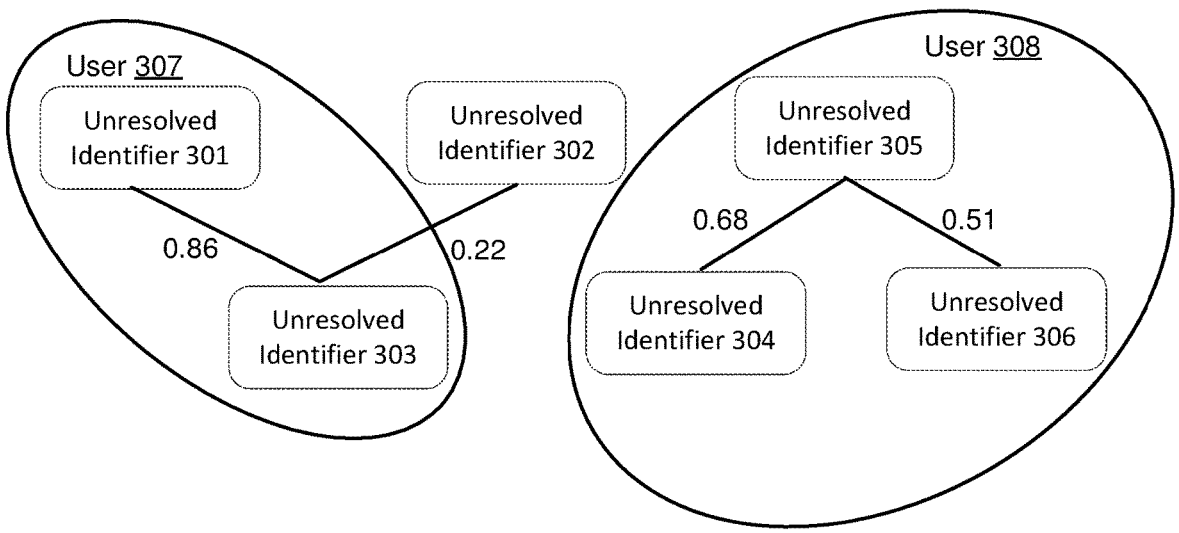
FIG. 3C is an example illustrating clustering of the plurality of unresolved identifier nodes of FIG. 3A, according to an embodiment.

FIG. 3C is an example illustrating clustering of the plurality of unresolved identifier nodes of FIG. 3A, according to an embodiment. In the embodiment shown in FIG. 3C, a pair of unresolved identifier nodes are clustered if the similarity score determined for the pair of unresolved identifiers exceeds a threshold similarity score of 0.5. Additional unresolved identifier nodes may be included in the cluster if the additional unresolved identifiers have a similarity score with at least one unresolved identifier in the cluster that exceeds the threshold similarity score of 0.5. In alternative embodiments, the threshold similarity score differs.

As shown in FIG. 3C, unresolved identifiers 301 and 303 have a similarity score of 0.86 and thus are clustered together. Note that unresolved identifier node 302 is not clustered with the unresolved identifier nodes 301 and 303 because the similarity score for unresolved identifier 302 and unresolved identifier 303 is 0.22, which is less than the threshold similarity score of 0.5. Additionally, unresolved identifier nodes 304, 305, and 306 are clustered together because the similarity score between unresolved identifiers 304 and 305 is 0.68 and the similarity score between unresolved identifiers 305 and 306 is 0.51.

Clustering of unresolved identifier nodes indicates a prediction that the clustered unresolved identifiers are associated with a common user. As shown in FIG. 3C, the cluster of unresolved identifier nodes 301 and 303 is associated with a common user 307 and the cluster of unresolved identifier nodes 304, 305, and 306 is associated with a common user 308.

In alternative embodiments not depicted here, unresolved identifier nodes are clustered responsive to an edge existing between the unresolved identifier nodes. In further alternative embodiments not shown here, the threshold similarity score can be equal or greater than the additional threshold similarity score.

Figure 4:
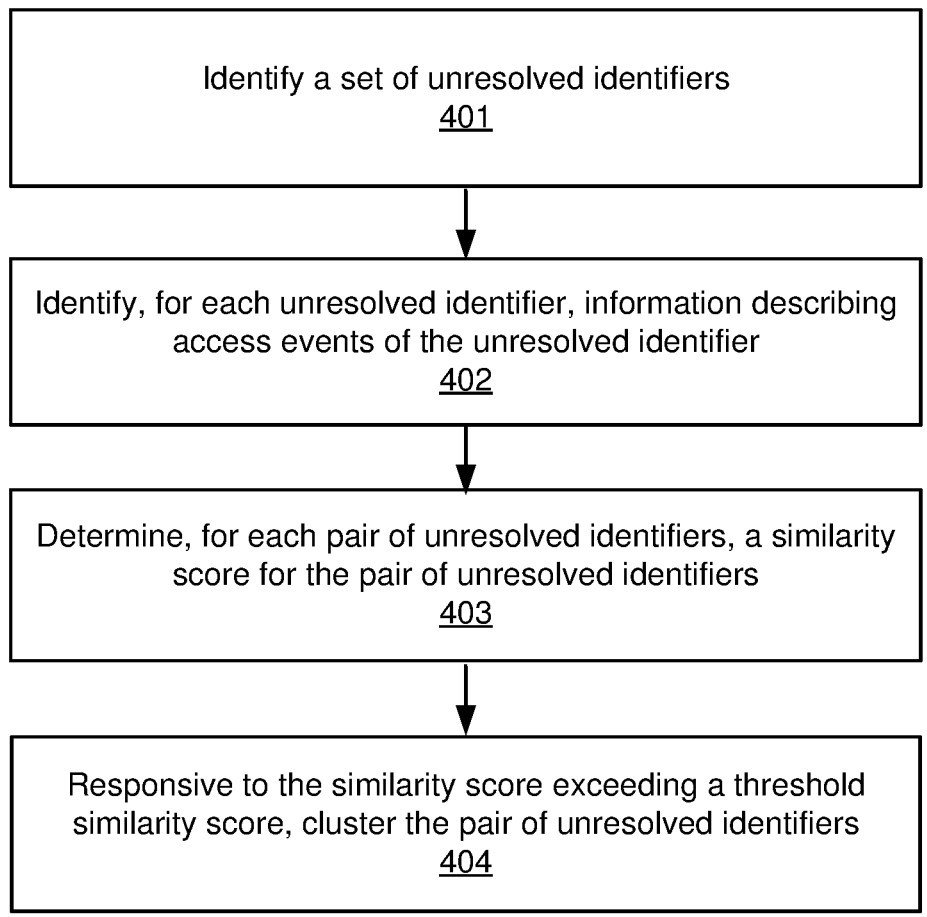
FIG. 4 is a flow chart of a method for clustering unresolved identifier nodes, according to an embodiment.

FIG. 4 is a flow chart of a method for clustering unresolved identifier nodes, according to an embodiment. In other embodiments, the method may include different and/or additional steps than those shown in FIG. 4. Additionally, steps of the method may be performed in different orders than the order described in conjunction with FIG. 4 in various embodiments.

The online system 140 identifies 401 a set of unresolved identifiers. As mentioned above with regard to FIG. 2, an identifier defines a context in which a client device 110 accesses one or more online systems. Furthermore, an unresolved identifier is an identifier that has not been determined to be associated with a specific user. In some embodiments, an unresolved identifier has not accessed a particular user profile on the online system 140, and thus is not associated with a particular user of the online system 140.

The online system 140 identifies 402, for each unresolved identifier, information describing access events associated with the unresolved identifier. Specifically, the information describes characteristics of one or more access events associated with the unresolved identifier. Embodiments of such information are described in greater detail above with regard to the action log 203 of FIG. 2.

The online system 140 determines 403, for each pair of unresolved identifiers, a similarity score for the pair of unresolved identifiers. A similarity score for a pair of unresolved identifiers represents a correlation between the information describing access events for each unresolved identifier of the pair. Thus the similarity score is based on the information identified in step 402.

Responsive to the determined similarity score exceeding a threshold similarity score, the online system 140 clusters 404 the pair of unresolved identifier nodes. As discussed above with regard to FIG. 2, in some embodiments, more than two unresolved identifier nodes may be included in a cluster of unresolved identifier nodes. Specifically, an unresolved identifier node may be included in a cluster of unresolved identifier nodes if the unresolved identifier has a similarity score with at least one unresolved identifier in the cluster of unresolved identifier nodes that exceeds the threshold similarity score. Clustering of unresolved identifiers indicates a prediction of the online system 140 that the cluster of unresolved identifiers is associated with a common user.

Note that in alternative embodiments not shown here, the method of FIG. 4 can also include generation of edges between pairs of unresolved identifier nodes. Edge generation is discussed in greater detail above with regard to FIGS. 2 and 3B.

FIG. 5 is an example illustrating determination of demographic information for a user associated with a plurality of clustered unresolved identifier nodes shown in FIG. 3C, according to an embodiment. Specifically, FIG. 5 is an example illustrating determination of demographic information for the user 308 of FIG. 3C. As shown in FIG. 3C, the user 308 is associated with a cluster of unresolved identifier nodes that includes the unresolved identifier nodes 304, 305, and 306.

As discussed above with regard to FIG. 2, demographic information for a common user associated with a cluster of unresolved identifier nodes can be predicted based on information associated with the unresolved identifiers and stored in the action log 203 of the online system 140. In some embodiments, information associated with unresolved identifiers can include actions performed by the identifiers via the network 150. In the embodiment shown in FIG. 5, the information associated with unresolved identifiers that is used to predict demographic information is browsing history 501. In alternative embodiments, alternative forms of information describing unresolved identifiers can be used in prediction of demographic information.

As shown in FIG. 5, browsing history 501 for the unresolved identifier 304 indicates that the unresolved identifier 304 was used to visit 3 baby name websites in the last week. Browsing history 501 for the unresolved identifier 305 indicates that the unresolved identifier 305 follows Taylor Swift on Instagram. Browsing history 501 for the unresolved identifier 306 indicates that the unresolved identifier 306 was used to watch Spongebob Squarepants videos.

Based on the browsing history 501 identified for the unresolved identifiers, each unresolved identifier determines predicted demographic information for the common user 308. In certain embodiments, predicted demographic information for an unresolved identifier is determined by inputting the information associated with the unresolved identifier into a demographic prediction model.

Based on the predicted demographic information determined for each unresolved identifier, aggregate demographic information is determined for the common user 308. In the embodiment shown in FIG. 5, aggregate demographic information is determined by conducting a poll. A poll is a method to estimate demographic information about the common user based on the respective information about the individual unresolved identifier nodes included in a cluster of unresolved identifier nodes associated with the user. In the poll depicted in FIG. 5, each unresolved identifier casts a single vote that reflects the predicted demographic information determined by the unresolved identifier.

In the embodiment shown in FIG. 5, a poll is conducted to determine a gender and an age of the common user 308. Each unresolved identifier 304, 305, and 306 casts a vote regarding the gender and the age of the common user 308. These votes are based on the predicted demographic information determined by the unresolved identifiers, which is in turn based on the browsing histories 501 of the unresolved identifiers. As shown in FIG. 5, the unresolved identifier 304 casts a gender vote 502 of "female" and an age vote 504 of "over 25 years old." The unresolved identifier 305 casts a gender vote 502 of "female" and an age vote 504 of "under 25 years old." The unresolved identifier 306 casts a gender vote 502 of "male" and an age vote 504 of "under 25 years old."

As discussed above with regard to FIG. 2, in some embodiments, such as the embodiment shown in FIG. 5, a confidence score is determined for the predicted demographic information for each unresolved identifier. A confidence score is a numerical value that represents a likelihood that demographic information predicted by an unresolved identifier is accurate. In certain embodiments, such as the embodiment shown in FIG. 5, votes cast by an unresolved identifier in a poll for determining aggregate demographic information for a user can be weighted based on confidence scores for the demographic information predicted by the unresolved identifier. Accordingly, as shown in FIG. 5, a gender confidence 503 for the unresolved identifier 304 is 0.5, a gender confidence 503 for the unresolved identifier 305 is 0.90, and a gender confidence 503 for the unresolved identifier 306 is 0.43. Similarly, an age confidence 505 for the unresolved identifier 304 is 0.81, an age confidence 505 for the unresolved identifier 305 is 0.24, and an age confidence 505 for the unresolved identifier 306 is 0.53.

The votes of the unresolved identifiers 304, 305, and 306 are weighted by respective confidence scores associated with demographic information predicted by the unresolved identifiers, and these weighted votes are used to determine aggregate demographic information for the user 308. Specifically, the gender votes 502 and the gender confidences 503 are used to determine an aggregate gender 506 for the user 308 and the age votes 504 and the age confidences 505 are used to determine an aggregate age 507 for the user 308.

To determine the aggregate gender 506, each gender vote 502 is weighted by its respective gender confidence 503, and the weighted gender votes are tallied. For example, in the embodiment shown in FIG. 5, the gender vote 502 by the unresolved identifier 304 for "female" is multiplied by its respective gender confidence 503 of 0.50. Thus 1*0.50=0.50. The gender vote 502 by the unresolved identifier 305 for "female" is multiplied by its gender confidence 503 of 0.90. Thus 1*0.90=0.90. The gender vote 502 by the unresolved identifier 306 for "male" is multiplied by its gender confidence 503 of 0.43. Thus 1*0.43=0.43. The weighted gender votes in each category are then tallied. In the embodiment shown in FIG. 5, the weighted gender votes are tallied by summing the weighted gender votes for "female" and the weighted gender votes for "male." Thus the tallied votes for "female"=0.50+0.90=1.40 and the tallied votes for "male"=0.43. Subsequently, the results are compared. In the embodiment of FIG. 5, the result with greatest value is determined to be the aggregate demographic information for the user 308. Therefore, because the tallied votes for "female" are greater than the tallied votes for "male", the aggregate gender 506 for the user is determined to be "female."

The aggregate age 507 is determined in a similar fashion. To determine the aggregate age 507, each age vote 504 is weighted by its respective age confidence 505, and the weighted age votes in each category are tallied. For example, in the embodiment shown in FIG. 5, the age vote 504 by the unresolved identifier 304 for "over 25 years old" is multiplied by its respective age confidence 505 of 0.84. Thus 1*0.84=0.84. The age vote 504 by the unresolved identifier 305 for "under 25 years old" is multiplied by its age confidence 505 of 0.21. Thus 1*0.21=0.21. The age vote 504 by the unresolved identifier 306 for "under 25 years old" is multiplied by its age confidence 505 of 0.53. Thus 1*0.53=0.53. The weighted age votes in each category are then tallied. In the embodiment shown in FIG. 5, the weighted age votes are tallied by summing the weighted age votes for "over 25 years old" and the weighted age votes for "under 25 years old." Thus the tallied votes for "over 25 years old"=0.84 and the tallied votes for "under 25 years old"=0.21+0.53=0.74. Subsequently, the results are compared. In the embodiment of FIG. 5, the result with greatest value is determined to be the aggregate demographic information for the user 308. Therefore, because the tallied votes for "over 25 years old" are greater than the tallied votes for "under 25 years old", the aggregate age 507 for the user is determined to be "over 25 years old." In alternative embodiment not shown here, aggregate demographic information can be determined by alternative methods.

Finally, in some embodiments, aggregate demographic information determined for a common user can be associated with each unresolved identifier in a cluster of unresolved identifiers that is associated with the common user. For example, the aggregate gender 506 and the aggregate age 507 may be associated with each unresolved identifier 304, 305, and 306, as well as with the user 308.

Figure 6:
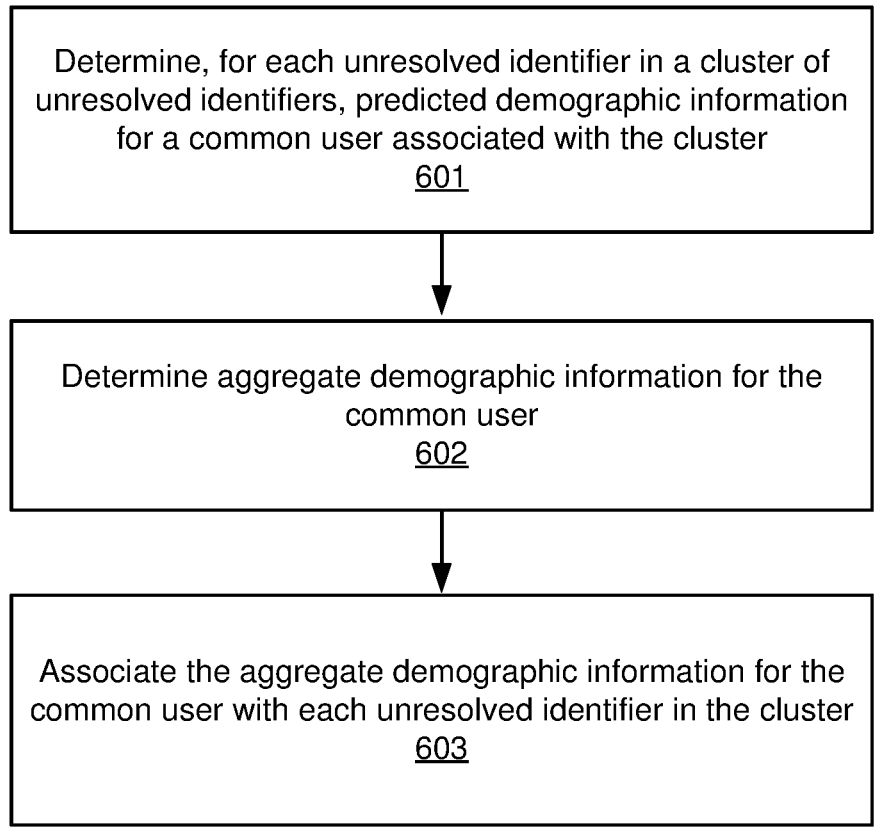
FIG. 6 is a flow chart of a method for determining demographic information for a user associated with a cluster of unresolved identifiers, according to an embodiment.

FIG. 6 is a flow chart of a method for determining demographic information for a user associated with a cluster of unresolved identifiers, according to an embodiment. In other embodiments, the method may include different and/or additional steps than those shown in FIG. 6. Additionally, steps of the method may be performed in different orders than the order described in conjunction with FIG. 6 in various embodiments.

The online system 140 determines 601, for each unresolved identifier in a cluster of unresolved identifiers, predicted demographic information for a common user associated with the cluster. The predicted demographic information determined by each unresolved identifier is based on the information associated with the unresolved identifier and stored in the action log 203 of the online system 140.

The online system 140 determines 602 aggregate demographic information for the common user. The determination of aggregate demographic information is based on the predicted demographic information determined for each unresolved identifier in the cluster of unresolved identifiers in step 601. FIG. 5 discusses one embodiment of determining aggregate demographic information based on predicted demographic information for multiple unresolved identifiers.

The online system 140 associates 603 the aggregate demographic information for the common user with each unresolved identifier in the cluster. In other words, after aggregate demographic information is determined 602 for the common user, each unresolved identifier that is included in the cluster associated with the common user is associated with the aggregate demographic information. These associations may be stored in the action log 203 of the online system 140 for future reference by the online system 140.

Figure 7:
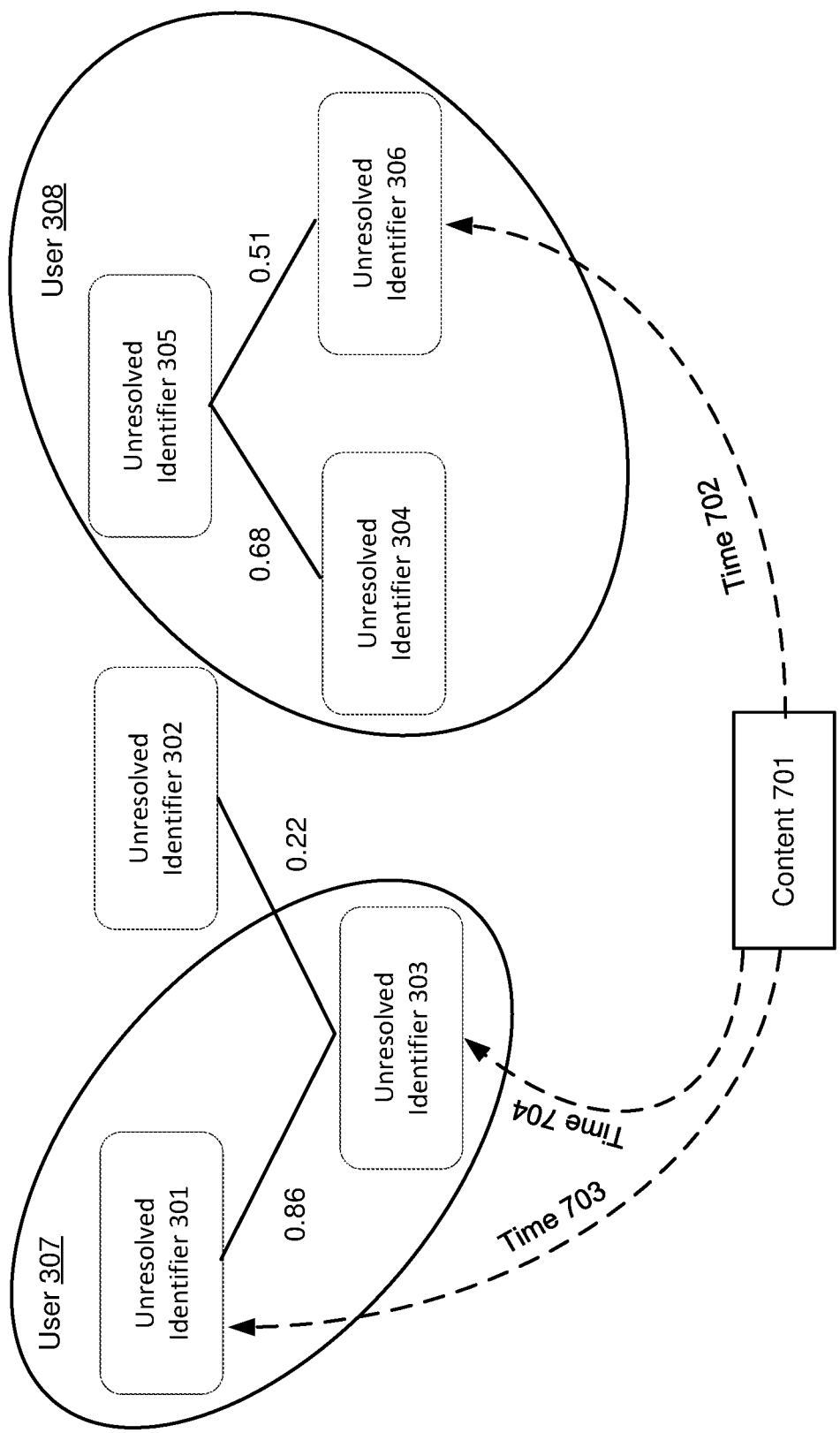
FIG. 7 is an example illustrating serving of content to client devices associated with one or more unresolved identifiers of the plurality of unresolved identifiers shown in FIG. 3C, according to an embodiment.

FIG. 7 is an example illustrating serving of content to client devices 110 associated with one or more unresolved identifiers of the plurality of unresolved identifiers shown in FIG. 3C, according to an embodiment.

As shown in FIG. 7, an opportunity to present content 701 to client devices 110 associated with one or more unresolved identifiers exists. The unresolved identifiers are clustered in the same way as depicted in FIG. 3C. Specifically, unresolved identifiers 301 and 303 are included in a cluster together, and the cluster is associated with the user 307. Additionally unresolved identifiers 304, 305, and 306 are included in a cluster together, and the cluster is associated with the user 308.

The presentation of the content 701 on client devices 110 associated with the unresolved identifiers is based on the clustering of the unresolved identifiers. In certain embodiments, for a cluster of unresolved identifiers, the content 701 is displayed on a single client device 110 associated with at least one unresolved identifier of the cluster of unresolved identifiers. For example, as shown in FIG. 7, at a time 702, the content 701 is presented on a client device 110 associated with the unresolved identifier 306. The content 701 is not presented on additional client devices 110 associated with additional unresolved identifiers that are included in the cluster that the unresolved identifier 306 is a part of Specifically, the content 701 is not presented on client devices 110 associated with the unresolved identifiers 304 and 305. This ensures that the common user 308 associated with the cluster of unresolved identifiers 304, 305, and 306 views the content 701 one time on one client device 110.

In alternative embodiments, for a cluster of unresolved identifiers, the content 701 is sequentially displayed on one or more client devices 110 associated with one or more unresolved identifiers in the cluster of unresolved identifiers. For example, as shown in FIG. 7, at a time 703, the content 701 is displayed on a client device 110 associated with the unresolved identifier 301. Subsequently, at a time 704 that occurs after the time 703, the content 701 is displayed on a client device 110 associated with the unresolved identifier 303. Note that because the unresolved identifiers 301 and 303 are clustered together and associated with the same user 307, this sequential display of the content 701 to client devices 110 associated with the unresolved identifiers 301 and 303 means that the user 307 views the content 701 twice. In some embodiments, the unresolved identifiers 301 and 303 are associated with the same client device 110, and thus the user 307 views the content 701 twice on the same client device. In alternative embodiments, the unresolved identifiers 301 and 303 are associated with different client devices 110, and thus the user 307 views the content 701 twice on two different client devices 110. In certain embodiments, a period of time passes between presenting the content 701 on the client device 110 associated with the unresolved identifier 301 and on the client device 110 associated with the unresolved identifier 303. This sequential and repeated display of the content 701 can increase the likelihood that the user 307 will interact with the content 701.

In some embodiments, such as the embodiment shown in FIG. 7, the content 701 is not presented on client devices 110 that are associated with un-clustered unresolved identifiers. For example, the content 701 is not presented on a client device 110 associated with the unresolved identifier 302 because the unresolved identifier 303 is not clustered with additional unresolved identifiers.

Figure 8:
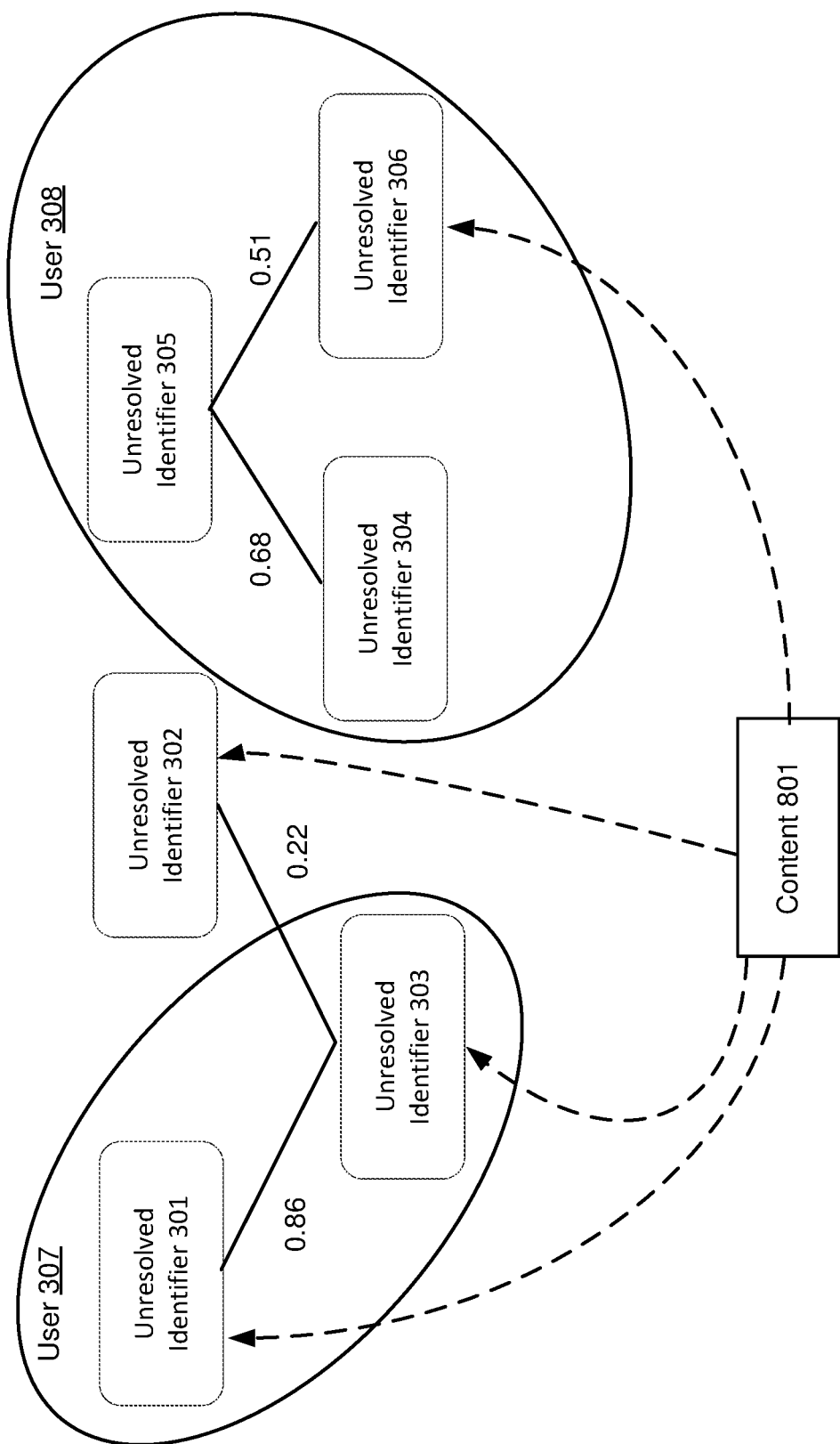
FIG. 8 is an example illustrating determination of reach of a content item served to client devices associated with one or more unresolved identifiers of the plurality of unresolved identifiers shown in FIG. 3C, according to an embodiment.

FIG. 8 is an example illustrating determination of reach of a content item that is served to client devices 110 associated with one or more unresolved identifiers of the plurality of unresolved identifiers shown in FIG. 3C, according to an embodiment. Reach of a content item represents a quantity of users presented with the content item.

The determination of reach of the content 801 is based on the clustering of the unresolved identifiers to which the content 801 is presented. As shown in FIG. 8, content 801 is presented to client devices 110 associated with unresolved identifiers 301, 302, 303, and 306. The unresolved identifiers are clustered in the same way as depicted in FIG. 3C. Specifically, unresolved identifiers 301 and 303 are included in a cluster together, and the cluster is associated with the user 307. Additionally unresolved identifiers 304, 305, and 306 are included in a cluster together, and the cluster is associated with the user 308.

The content 801 is presented on a client device 110 associated with the unresolved identifier 306. The unresolved identifier 306 is associated with the user 308. Therefore, the reach of the content 801 when presented on the client device 110 associated with the unresolved identifier 306 is 1 user—namely the user 308. Note that the content 801 is not presented on client devices 110 associated with additional unresolved identifiers that belong to the same cluster and are associated with the same user 308 as the unresolved identifier 306.

On the other hand, the content 801 is presented both on a client device 110 associated with the unresolved identifier 301 and on a client device 110 associated with the unresolved identifier 303, and the unresolved identifiers 301 and 303 are both associated with the same user 307. Therefore, the reach of the content 801 when presented on the client devices 110 associated with the unresolved identifiers 301 and 303 is only 1 user—namely the user 307.

As shown in FIG. 8, the content 801 is also presented on a client device 110 associated with the unresolved identifier 302. In certain embodiments, such as the embodiment shown in FIG. 8, un-clustered unresolved identifiers are excluded from reach calculation because un-clustered unresolved identifiers are not associated with a particular user. Thus despite the presentation of the content 801 to the client device 110 associated with the unresolved identifier 302, the reach of the content 801 when presented on the client device 110 associated with the unresolved identifier 302 is 0 users.

Based on the above cluster-by-cluster reach calculation for the content 801, the total reach of the content 801 equals 2 users (i.e. user 307 and user 308). By calculating reach based on clustering, the calculated reach can be more accurate because it accounts for users viewing the content item multiple times via different identifiers.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying, by an online system, a set of unresolved identifiers, wherein an unresolved identifier defines a context in which a client device accesses one or more online systems, and wherein the context has not been determined to be associated with a specific user;
   identifying, by the online system, for each unresolved identifier of the set of unresolved identifiers, information associated with the unresolved identifier, the information describing characteristics of one or more access events associated with the unresolved identifier;
   for each pair of unresolved identifiers in the set of unresolved identifiers:
      determining, by the online system, based on the information associated with each unresolved identifier, a similarity score for the pair of unresolved identifiers;
      determining, by the online system, that the determined similarity score exceeds a threshold similarity score;

responsive to determining that the similarity score exceeds the threshold similarity score:
  clustering, by the online system, the pair of unresolved identifiers, the clustering indicating a prediction that the pair of unresolved identifiers are associated with a common user; and
for each cluster of unresolved identifiers:
  determining predicted demographic information for each unresolved identifier in the cluster of unresolved identifiers, wherein predicted demographic information associated with an unresolved identifier comprises a prediction of a demographic trait of the common user based on the associated unresolved identifier;
  determining aggregate demographic information for the common user based on the predicted demographic information for each unresolved identifier in the cluster of unresolved identifiers; and
  associating, by the online system, the aggregate demographic information for the common user with each unresolved identifier in the cluster of unresolved identifiers.

2. The method of claim 1, wherein each unresolved identifier from the set of unresolved identifiers is selected from a group comprising a browser ID, a device ID, an HTML, request, and an IP address.

3. The method of claim 1, wherein the characteristics of one or more access events associated with the unresolved identifier comprise at least one of a context of the one or more access events, content accessed during the one or more access events, actions performed during the one or more access events, and derived data learned from the one or more access events.

4. The method of claim 1, wherein the similarity score for the pair of unresolved identifiers is based on a similarity of the information associated with each unresolved identifier of the pair of unresolved identifiers.

5. The method of claim 1, the method further comprising:
determining, by the online system, that the determined similarity score for the pair of unresolved identifiers exceeds an additional threshold similarity score; and
responsive to determining that the similarity score exceeds the additional threshold similarity score:
  generating, by the online system, an edge between the pair of unresolved identifiers.

6. The method of claim 5, wherein clustering the pair of unresolved identifiers further comprises:
determining, by the online system, that an edge exists between the pair of unresolved identifiers; and
responsive to determining that the edge exists between the pair of unresolved identifiers:
  clustering, by the online system, the pair of unresolved identifiers, the clustering indicating a prediction that the pair of unresolved identifiers are associated with a common user.

7. The method of claim 1, wherein clustering of the pair of unresolved identifiers further comprises clustering an additional unresolved identifier with the pair of unresolved identifiers, the additional unresolved identifier having a similarity score with at least one unresolved identifier of the pair of unresolved identifiers that exceeds the threshold similarity score.

8. The method of claim 1, wherein determining predicted demographic information for each unresolved identifier in the cluster of unresolved identifiers further comprises inputting the identified information associated with the unresolved identifier into a demographic prediction model.

9. The method of claim 1, wherein determining aggregate demographic information for the common user based on the predicted demographic information for each unresolved identifier in the cluster of unresolved identifiers further comprises conducting a poll, wherein each unresolved identifier casts a single vote based on the predicted demographic information for the unresolved identifier.

10. The method of claim 9, further comprising:
determining, by the online system, a confidence score for the predicted demographic information for the unresolved identifier; and
weighting, by the online system, the vote for the unresolved identifier based on the determined confidence score.

11. A non-transitory computer-readable medium having instructions for execution by a processor causing the processor to:
identify, by an online system, a set of unresolved identifiers, wherein an unresolved identifier defines a context in which a client device accesses one or more online systems, and wherein the context has not been determined to be associated with a specific user;
identify, by the online system, for each unresolved identifier of the set of unresolved identifiers, information associated with the unresolved identifier, the information describing characteristics of one or more access events associated with the unresolved identifier;
for each pair of unresolved identifiers in the set of unresolved identifiers:
  determine, by the online system, based on the information associated with each unresolved identifier, a similarity score for the pair of unresolved identifiers;
  determine, by the online system, that the determined similarity score exceeds a threshold similarity score;
  responsive to determining that the similarity score exceeds the threshold similarity score:
    cluster, by the online system, the pair of unresolved identifiers, the clustering indicating a prediction that the pair of unresolved identifiers are associated with a common user; and
for each cluster of unresolved identifiers:
  determine predicted demographic information for each unresolved identifier in the cluster of unresolved identifiers, wherein predicted demographic information associated with an unresolved identifier comprises a prediction of a demographic trait of the common user based on the associated unresolved identifier;
  determine aggregate demographic information for the common user based on the predicted demographic information for each unresolved identifier in the cluster of unresolved identifiers; and
  associate, by the online system, the aggregate demographic information for the common user with each unresolved identifier in the cluster of unresolved identifiers.

12. The non-transitory computer-readable medium of claim 11, wherein each unresolved identifier from the set of unresolved identifiers is selected from a group comprising a browser ID, a device ID, an HTML request, and an IP address.

13. The non-transitory computer-readable medium of claim 11, wherein the characteristics of one or more access events associated with the unresolved identifier comprise at least one of a context of the one or more access events, content accessed during the one or more access events, actions performed during the one or more access events, and derived data learned from the one or more access events.

14. The non-transitory computer-readable medium of claim 11, wherein the similarity score for the pair of unresolved identifiers is based on a similarity of the information associated with each unresolved identifier of the pair of unresolved identifiers.

15. The non-transitory computer-readable medium of claim 11, wherein the instructions further cause the processor to:
   determine, by the online system, that the determined similarity score for the pair of unresolved identifiers exceeds an additional threshold similarity score; and
   responsive to determining that the similarity score exceeds the additional threshold similarity score:
      generate, by the online system, an edge between the pair of unresolved identifiers.

16. The non-transitory computer-readable medium of claim 15, wherein the instructions causing the processor to cluster the pair of unresolved identifiers further causes the processor to:
   determine, by the online system, that an edge exists between the pair of unresolved identifiers; and
   responsive to determining that the edge exists between the pair of unresolved identifiers:
      cluster, by the online system, the pair of unresolved identifiers, the clustering indicating a prediction that the pair of unresolved identifiers are associated with a common user.

17. The non-transitory computer-readable medium of claim 11, wherein the instructions causing the processor to cluster of the pair of unresolved identifiers further cause the processor to cluster an additional unresolved identifier with the pair of unresolved identifiers, the additional unresolved identifier having a similarity score with at least one unresolved identifier of the pair of unresolved identifiers that exceeds the threshold similarity score.

18. The non-transitory computer-readable medium of claim 11, wherein the instructions causing the processor to determine predicted demographic information for each unresolved identifier in the cluster of unresolved identifiers further cause the processor to input the identified information associated with the unresolved identifier into a demographic prediction model.

19. The non-transitory computer-readable medium of claim 11, wherein the instructions causing the processor to determine aggregate demographic information for the common user based on the predicted demographic information for each unresolved identifier in the cluster of unresolved identifiers further cause the processor to conduct a poll, wherein each unresolved identifier casts a single vote based on the predicted demographic information for the unresolved identifier.

20. The non-transitory computer-readable medium of claim 11, wherein the instructions further cause the processor to:
   determine, by the online system, a confidence score for the predicted demographic information for the unresolved identifier; and
   weight, by the online system, the vote for the unresolved identifier based on the determined confidence score.

* * * * *

UNITED STATES PATENT AND TRADEMARK OFFICE
CERTIFICATE OF CORRECTION

PATENT NO. : 11,328,212 B1
APPLICATION NO. : 15/883031
DATED : May 10, 2022
INVENTOR(S) : Chaochao Cai et al.

It is certified that error appears in the above-identified patent and that said Letters Patent is hereby corrected as shown below:

In the Claims

In Column 19, Claim 2, Line 26, delete "HTML," and insert -- HTML --, therefor.

In Column 22, Claim 17, Line 1, delete "cluster of the" and insert -- cluster the --, therefor.

Signed and Sealed this
Sixth Day of June, 2023

Katherine Kelly Vidal
*Director of the United States Patent and Trademark Office*